US009998745B2

United States Patent
Li et al.

(10) Patent No.: US 9,998,745 B2
(45) Date of Patent: Jun. 12, 2018

(54) TRANSFORMING VIDEO BIT STREAMS FOR PARALLEL PROCESSING

(71) Applicant: Microsoft Technology Licensing, LLC, Redmond, WA (US)

(72) Inventors: Yuechuan Li, Issaquah, WA (US); Yongjun Wu, Bellevuw, WA (US); Shyam Sadhwani, Bellevue, WA (US); Bakkama Srinath Reddy, Redmond, WA (US); Matthew R. Wozniak, Bellevue, WA (US); Victor V. Cherepanov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 406 days.

(21) Appl. No.: 14/927,166

(22) Filed: Oct. 29, 2015

(65) Prior Publication Data

US 2017/0127072 A1    May 4, 2017

(51) Int. Cl.
| | |
|---|---|
| H04N 19/436 | (2014.01) |
| H04N 19/593 | (2014.01) |
| H04N 19/513 | (2014.01) |
| H04N 19/44 | (2014.01) |
| H04N 19/96 | (2014.01) |
| H04N 19/13 | (2014.01) |

(52) U.S. Cl.
CPC .......... *H04N 19/436* (2014.11); *H04N 19/13* (2014.11); *H04N 19/44* (2014.11); *H04N 19/513* (2014.11); *H04N 19/593* (2014.11); *H04N 19/96* (2014.11)

(58) Field of Classification Search
CPC ...... H04N 19/13; H04N 19/436; H04N 19/44; H04N 19/513; H04N 19/593; H04N 19/96
See application file for complete search history.

(56) References Cited

U.S. PATENT DOCUMENTS

| | | | |
|---|---|---|---|
| 7,599,438 B2 | 10/2009 | Holcomb et al. | |
| 8,928,796 B2* | 1/2015 | Van Heugten | H04N 5/2258 348/340 |
| 2007/0133608 A1* | 6/2007 | Isambart | H04N 17/004 370/484 |
| 2009/0003446 A1* | 1/2009 | Wu | H04N 19/176 375/240.16 |
| 2009/0220011 A1* | 9/2009 | Kursawe | H04N 21/23424 375/240.25 |

(Continued)

OTHER PUBLICATIONS

Pourazad, et al., "HEVC: The New Gold Standard for Video Compression Hyper-Threading Architectures", In IEEE Consumer Electronics Magazine, Jun. 22, 2012, pp. 34-46.

(Continued)

*Primary Examiner* — Anner N Holder (57) ABSTRACT

Aspects extend to methods, systems, and computer program products for transforming video bit streams for parallel decoding. Aspects of the invention can be used to break segment coding structure limitations in video bit streams. Aspects can be used to maximize parallelization of video decoding tasks, including motion compensation processing, to more efficiently utilize multi-core and multi-processor computer systems. Multiple portions of intra-segment data can be processed in parallel to speed up single frame processing. Video communication latency and memory requirements are also reduced.

20 Claims, 7 Drawing Sheets

(56) References Cited

U.S. PATENT DOCUMENTS

| | | | |
|---|---|---|---|
| 2009/0323826 | A1 | 12/2009 | Wu et al. |
| 2010/0239008 | A1 | 9/2010 | Chujoh et al. |
| 2012/0236940 | A1 | 9/2012 | Katzur et al. |
| 2013/0070841 | A1 | 3/2013 | Wahadaniah et al. |
| 2014/0301472 | A1 | 10/2014 | Kadono et al. |
| 2014/0348243 | A1* | 11/2014 | Sato ............. H04N 19/52 375/240.16 |
| 2015/0010091 | A1* | 1/2015 | Hsu ............... H04N 19/124 375/240.29 |
| 2015/0103921 | A1* | 4/2015 | Hannuksela ..... H04N 19/152 375/240.26 |
| 2015/0110172 | A1 | 4/2015 | Ye et al. |
| 2017/0006284 | A1* | 1/2017 | Gokhale ........... H04N 19/61 |

OTHER PUBLICATIONS

Ge, et al., "Efficient Multithreading Implementation of H.264 Encoder on Intel Hyper-Threading Architectures", In Proceedings of the Joint Conference of the Fourth International Conference on Information, Communications and Signal Processing, and Fourth Pacific Rim Conference on Multimedia, vol. 1, Dec. 15, 2003, 5 pges.

Han, et al., "HEVC Decoder Acceleration on Multi-Core X86 Platform", In IEEE International Conference on Acoustics, Speech and Signal Processing, May 4, 2014, pp. 7353-7357.

Mesa, et al., "Parallel Video Decoding in the Emerging HEVC Standard", In IEEE International Conference on Acoustics, Speech and Signal Processing, Mar. 25, 2012, 4 pages.

Sze, et al., "A High Throughput CABAC Algorithm using Syntax Element Partitioning", In Proceedings of the 16th IEEE international conference on Image Processing, Nov. 7, 2009, 4 page.

Wang, et al., "A New Motion Compensation Design for H.264/AVC Decoder", In IEEE International Symposium on Circuits and Systems, May 23, 2005, pp. 4558-4561.

Wang, et al., "Motion Compensation Architecture for 8k UHDTV HEVC Decoder", In IEEE International Conference on Multimedia and Expo, Jul. 14, 2014, 6 pages.

Hong, et al., "A Parallelization Technique with Integrated Multi-Threading for Video Decoding on Multi-core Systems", In Proceedings of KSII Transactions on Internet and Information Systems vol. 7, Issue 10, Oct. 2013, pp. 2479-2496.

Sullivan, et al., "Overview of the High Efficiency Video Coding (HEVC) Standard", In IEEE Transactions on Circuits and Systems for Video Technology, vol. 22, Issue 12, Dec. 2012, pp. 1649-1668.

\* cited by examiner

TRANSFORMING VIDEO BIT STREAMS FOR PARALLEL PROCESSING

CROSS-REFERENCE TO RELATED APPLICATIONS

Not Applicable

BACKGROUND

1. Background and Relevant Art

Computer systems and related technology affect many aspects of society. Indeed, the computer system's ability to process information has transformed the way we live and work. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. For example, distributed applications can have components at a number of different computer systems.

In some environments, video data is streamed from one computer system to another computer system over a computer network, such as, for example, the Internet. At many resolutions, transferring raw video is not practical due to the sheer volume of data. As such, compression algorithms are used to reduce the volume of data transferred over a network. A sending computer system sends compressed (encoded) video data to a receiving computer system over a network. The receiving computer system receives the compressed video data over the network. The receiving computer system then uncompresses (decodes) the compressed video data for presentation at video output device, such as, a television or computer monitor.

Video data can be compressed in accordance with various different encoding formats, including H.264 (Advanced Video Coding (AVC)), High Efficiency Video Coding (HEVC) (H.265), VP8, VP9, etc. Encoding formats typically divide each frame of streamed video data into one or more segments, such as, for example, tiles or slices. The sizes and configuration of segments can vary by format and based on the video data within a segment. Encoding formats also typical define that processing within a segment is performed on a row by row basis starting at the left side of the upper most row (e.g., raster order). As such, encoding formats can also define that parameters for decoding and presenting data in later parts of a segment are dependent on parameters used to decode and present data earlier in the segment.

Thus, within each segment, parameter values for decoding and presenting data in later parts of the segment typically depend on or are relative to parameter values for decoding and presenting data in earlier part of the segment. For example, a coordinate value (0, 0) can indicate the location for an initial data portion within a segment. If the next data portion is to be located at (32,32), the encoding parameters, for example, motion vector, of (0,0) is also used to indicate the encoding parameters (e.g., motion vector) of the next data portion. The encoding parameters of (0, 0) for next data portion is considered relative to the prior coordinate value of (0, 0) for the initial data portion resulting in a location of (32, 32). Using relative or dependent values can reduce associated overhead during an encoding process.

However, using relative or dependent values within a segment also limits the ability to process intra-segment video data in parallel during decoding. Since later parameters within a segment are dependent on earlier parameters within the segment, data portions have to be processed in a serial manner so that dependencies can be handled appropriately. Serial processing is an inefficient use of resources on multiprocessor and multicore systems. For example, one processor or core can be used to serially decode video data while one or more other processors or cores remain idle.

BRIEF SUMMARY

Examples extend to methods, systems, and computer program products for transforming video bit streams for parallel processing. A frame from a video bit stream is received. The frame is partitioned into one or more segments. For at least one of the segments, a first data portion and second data portion are at least partially decoded from the segment. The first data portion has first parameters defining how to visually present the first data portion and the second data portion has second parameters defining how to visually present the second data portion. It is determined that values for the second parameters are dependent on values for the first parameters.

A reconstructed frame is formed. The reconstructed frame breaks the dependency of the values for the second parameters on the values for the first parameters. Forming the reconstructed frame includes calculating new (e.g., absolute) values for the second parameters based on the values for the second parameters and the values for the first parameters. The frame is reconstructed in one or more independently processable sections. Within one of the one or more independently processable sections, the new values for the second parameters are used to define how to visually present the second data portion. Accordingly, the second data portion can be processed in parallel with the first data portion.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Examples extend to methods, systems, and computer program products for transforming video bit streams for parallel processing. A frame from a video bit stream is received. The frame is partitioned into one or more segments. For at least one of the segments, a first data portion and second data portion are at least partially decoded from the segment. The first data portion has first parameters defining how to visually present the first data portion and the second data portion has second parameters defining how to visually present the first data portion. It is determined that values for the second parameters are dependent on values for the first parameters.

A reconstructed frame is formed. The reconstructed frame breaks the dependency of the values for the second parameters on the values for the first parameters. Forming the reconstructed frame includes calculating new (e.g., absolute) values for the second parameters based on the values for the second parameters and the values for the first parameters. The frame is reconstructed in one or more independently processable sections. Within one of the one or more independently processable sections, the new values for the second parameters are used to define how to visually present the second data portion. Accordingly, the second data portion can be processed in parallel with the first data portion.

Implementations may comprise or utilize a special purpose or general-purpose computer including computer hardware, such as, for example, one or more processors (including Central Processing Units (CPUs) and/or Graphical Processing Units (GPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, pagers, watches, fitness monitors, eye glasses, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and in the following claims, a "video bit stream" is defined as a contiguous sequence of bits representing a stream of video data transmitted over a communications path (e.g., network or local bus). A video bit stream can be encoded (e.g., compressed) according to a standard, such as, for example, H.264 (Advanced Video Coding (AVC)), High Efficiency Video Coding (HEVC) (H.265), VP8, VP9, etc.

In this description and in the following claims, a "frame" is defined as an electronically coded still image. A video bit stream can include a plurality of sequenced frames representative of video data to be presented at a video presentation device.

In this description and in the following claims, a "segment" is defined as subdivision of a frame, such as, for example, a tile, a slice, a block, etc. As such, a frame can include one or more segments. Each segment in a frame can include part of the video data for the frame. A segment can be further divided into one or more smaller units. Each smaller unit in a segment can contain a portion of video data for the segment along with corresponding parameters and parameter values (e.g., name/value pairs) indicating how the portion of video data within the smaller unit is to be rendered. Segment is defined to include different sizes, shapes, arrangements and layouts of subunits for dividing a frame in accordance with essentially any encoding standard, including H.264 (AVC), HEVC (H.265), VP8, VP9, etc.

In this description and in the following claims, a "section" is defined as a parallel processing unit row with one or multiple of the largest coding unit for a specified coding standard, such as, for example, Coding Tree Units (CTUs) for HEVC, Macroblocks for H.264, Superblocks for VP9, etc. Sections can be used to divide a single frame into multiple independent processing spaces. A section can dynamically adapt to available computing resources (e.g., CPU cores, threads) in runtime.

Aspects of the invention can be used to break segment coding structure limitations in video bit streams. Aspects can be used to maximize parallelization of video decoding tasks, including motion compensation processing, to more efficiently utilize multi-core and multi-processor computer systems. Multiple portions of intra-segment data can be processed in parallel to speed up single frame processing. Video communication latency and memory requirements are also reduced.

Figure 1A:
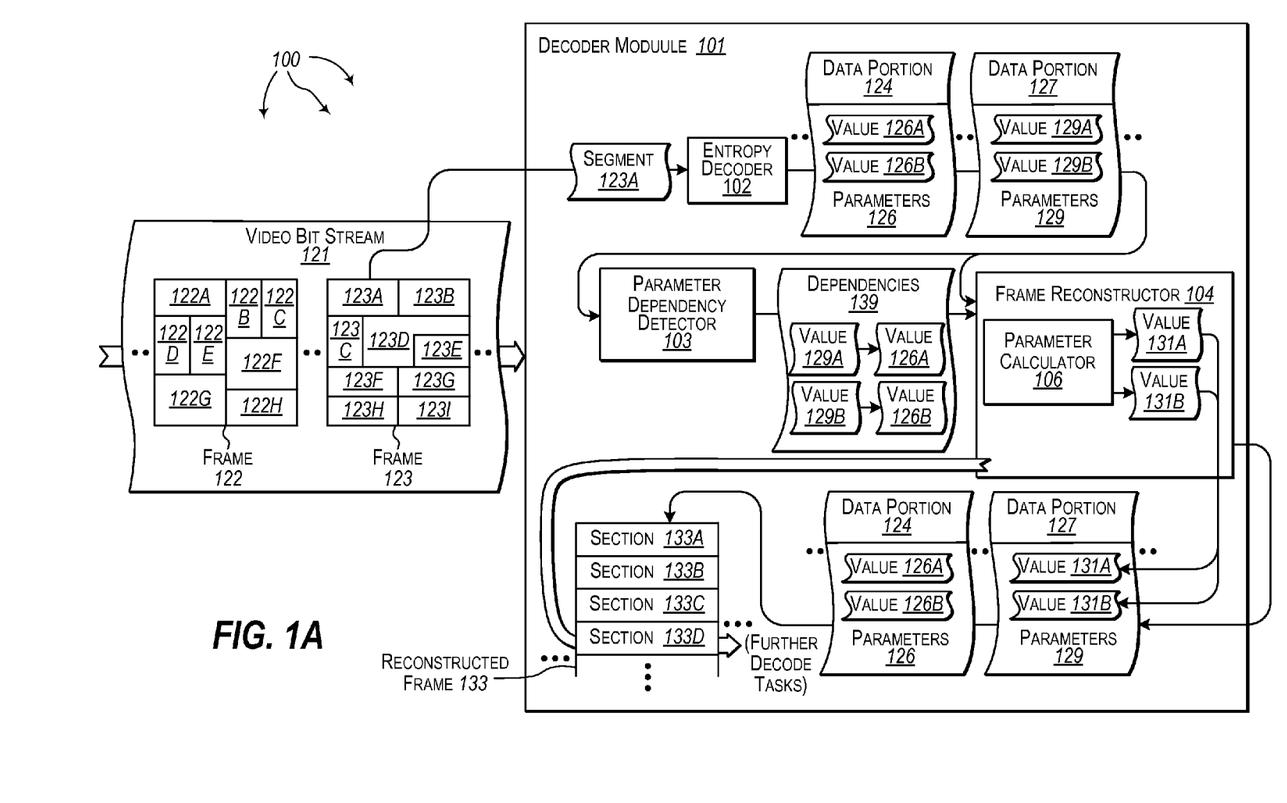
FIG. 1A illustrates an example architecture that facilitates transforming a video bit stream for parallel processing.

FIG. 1A illustrates an example of an architecture 100 that facilitates transforming a video bit stream for parallel processing. Referring to FIG. 1, computer architecture 100 includes decoder module 101. Decoder module 101 can be connected to (or be part of) a network, such as, for example, a Local Area Network ("LAN"), a Wide Area Network ("WAN"), and even the Internet. Accordingly, decoder module 101, as well as any other connected computer systems and their components, can create message related data and exchange message related data, including video bit streams over the network.

In general, decoder module 101 is configured to decode a video bit stream into video data for rendering at a video presentation device, such as, a television, computer monitor, mobile device screen, or other display device. As depicted, decoder module includes entropy decoder 102, parameter dependency detector 104, and frame reconstructor 104.

Entropy decoder 102 (e.g., a CABAC decoder or a Context-Adaptive Variable-Length Coding (CAVLC) decoder) can decode data and parameters from segments (e.g., tiles or slices) in a frame of a video bit stream frame. Each segment can include one or more portions of video data for rendering at a video presentation device. Entropy decoder 102 can be a decoder configured to decode a video bit stream encoded in accordance with any of a variety of standards including: H.264 (Advanced Video Coding (AVC)), High Efficiency Video Coding (HEVC) (H.265), VP8, VP9, etc.

Within a segment, parameter values corresponding to one data portion (e.g., data later in the segment) can depend on parameter values corresponding to another data portion (e.g., data earlier in the segment). In one aspect, parameter values for later data in a segment are considered relative to parameter values for early data in the segment when determining how to render the later data. Parameter dependency detector 103 can detect dependencies between parameter values of different data portions within a segment.

Frame reconstructor 104 can form a reconstructed frame from the content of a received frame. Dependencies between parameter values in a reconstructed frame are removed. Parameter calculator 106 can use detected dependencies between parameter values to calculate new parameter values that are not dependent on other parameter values. For example, within a segment, it may be that the location of data later in the segment is determined relative to the location of data earlier in the segment. Parameter calculator 106 can calculate an absolute value for the location of the later data to remove the dependency on the location of the earlier data.

Frame reconstructor 104 can form a reconstructed frame including one or more independently processable sections. Within each section, newly calculated parameter values are associated with corresponding data portions. Using newly calculated parameter values breaks any prior dependencies between parameter values (that may have been present in a segment). Accordingly, portions of data within a section can be more easily processed in parallel.

Figure 2:
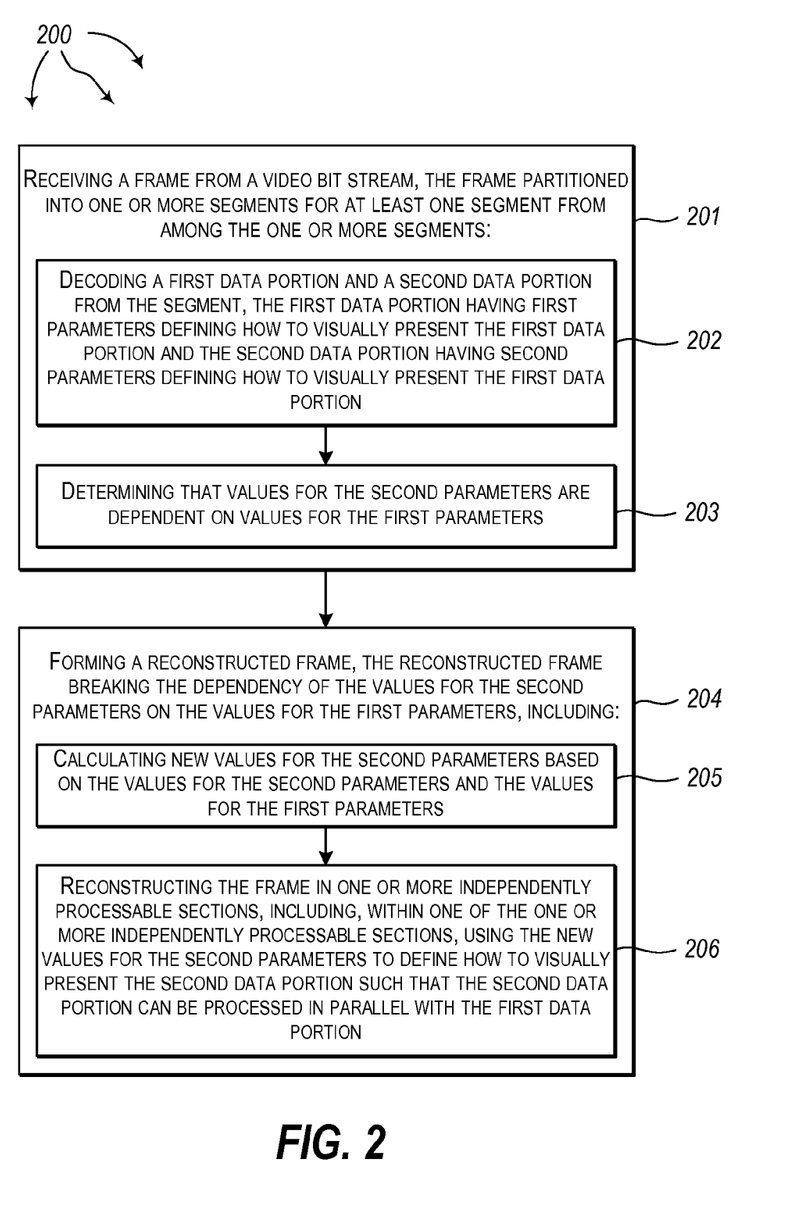
FIG. 2 illustrates a flow chart of an example method for transforming a video bit stream for parallel processing.

FIG. 2 illustrates a flow chart of an example method 200 for transforming a video bit stream for parallel processing. Method 200 will be described with respect to the components and data of computer architecture 100.

Video bit stream 121 can be streamed from another device or system to decoder module 101 over a network or local bus connection. As depicted, video bit stream 121 includes a plurality of frames including frames 122 and 123.

Method 200 includes receiving a frame from a video bit stream, the frame partitioned into one or more segments (201). For example, decoder module 101 can receive frames 122, 123, etc. as the frames are streamed to decoder 101. As depicted, frame 122 is segmented into segments 122A-122H and frame 123 is segmented into segments 123A-123I. Each segment with frames 122 and 123 can include video data and corresponding parameters indicating how to rendering the video at a video presentation device.

In general, during encoding, parameter values for different portions of intra-segment data (i.e., different data portions in the same segment) are encoded to depend on one another. For example, video bit steam 121 can be encoded in consideration that decoding is to occur within each segment using a pre-defined processing order, such as, for example, raster order (left to right, top to bottom). Knowledge of the pre-defined processing order can be leveraged during encoding to reduce processing overhead. For example, within a segment, parameter values for data portions that are to be processed later can be made dependent of parameter values for data portions that are to be processed earlier.

For at least one segment from among the one or more segments, method 200 includes decoding a first data portion and a second data portion from the segment, the first data portion having first parameters defining how to visually present the first data portion and the second data portion having second parameters defining how to visually present the first data portion (202). For example, entropy decoder 102 can decode segment 124 into a plurality of data portions and corresponding parameter values, including data portion 124 and parameters 126 and data portion 127 and parameters 129.

Parameter values 126A, 126B, etc. include values for one or more corresponding parameters indicating how to render data portion 124 at a video presentation device. Similarly, parameter values 129A, 129B, etc. include values for one or more corresponding parameters indicating how to render data portion 127 at a video presentation device. In general, parameters can include any of motion vectors, block partitions, reference indices, etc.

For the at least one segment from among the one or more segments, method 200 includes determining that values for the second parameters are dependent on values for the first parameters (203). For example, parameter dependency detector 103 can detect dependencies 139. Parameter dependency detector 103 can determine that value 129A depends on (e.g., is relative to) value 126A and that value 129B depends on (e.g., is relative to) value 126B.

Method 200 includes forming a reconstructed frame, the reconstructed frame breaking the dependency of the values for the second parameters on the values for the first parameters (204). For example, frame reconstructsor 104 can form reconstructed frame 133. Reconstructed frame 133 breaks the dependency of value 129A on value 126A and breaks the dependency of value 129B on value 126B.

Forming a reconstructed frame includes calculating new values for the second parameters based on the values for the second parameters and the values for the first parameters (205). For example, parameter calculator 106 can calculate value 131A based on values 129A and 126A. Similarly, parameter calculator 106 can calculate value 131B based on values 129B and 126B. In aspect, where the location for a portion of data is relative to the location for another portion of data, parameter calculator 106 can calculate an absolute location for the portion of data to break the dependency.

Forming a reconstructed frame includes reconstructing the frame in one or more independently processable sections, including, within one of the one or more independently processable sections, using the new values for the second parameters to define how to visually present the second data portion such that the second data portion can be processed in parallel with the first data portion (206). For example, frame reconstructor 104 can form reconstructed frame 133 in sections 133A, 133B, 133C, 133D, etc. Within parameters 129, frame reconstructor 104 can replace values 129A and 129B with values 131A and 131B respectively.

Frame reconstructor 104 can store data portion 124 and parameters 126 and data portion 127 and parameters 129 in section 133A. As such, values 131A and 131B define how to render data portion 127. Since values 131A and 131B do not depend on other parameter values, data portion 127 can be processed in parallel with data portion 124 as well as other data portions.

Other segments in frame 123 can be processed similar to segment 123A to remove intra-segment dependencies between parameter values. Accordingly, data portions in each of sections 133A, 133B, 133C, 133D can be processed in parallel to increase decoding efficiency. Reconstructed frame 133 can be forwarded on to further decode tasks where parallel processing can occur.

Segments in frame 122 as well as segments in other frames of video bit stream 121 can also be processed similar to segment 123A to remove intra-segment dependencies between parameter values. A reconstructed frame including one or more sections can be formed for frame 122 and any other frames of video bit stream 121. Data portions in these other reconstructed frames can also be processed in parallel to increase decoding efficiency. These other reconstructed frames can also be forwarded on to further decode tasks wherein parallel processing can occur.

Figure 1B:
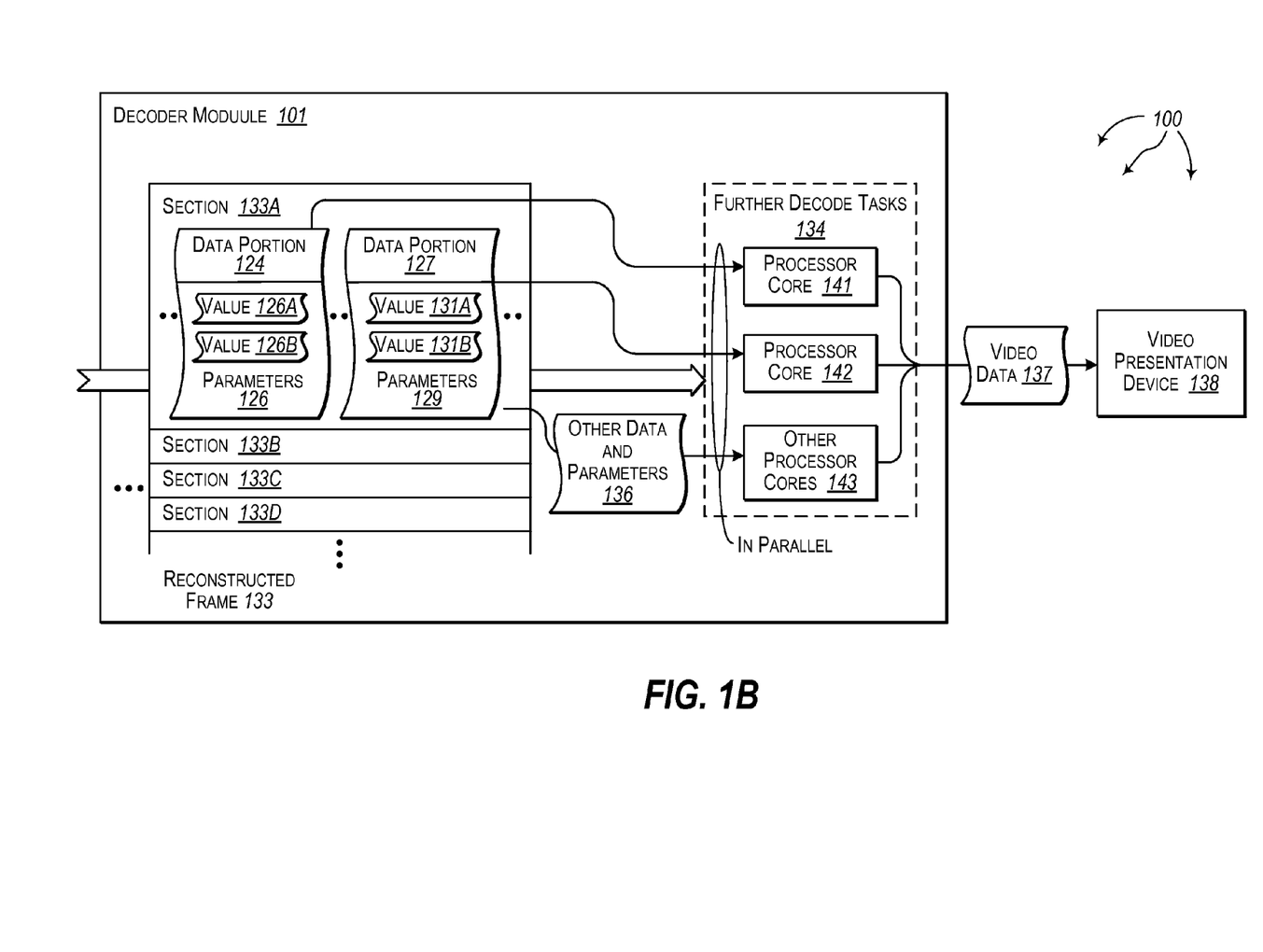
FIG. 1B illustrates an example architecture that facilitates parallel processing of data from a video bit stream.

Turning to FIG. 1B, FIG. 1B illustrates a continuation example of computer architecture 100 that facilitates parallel processing of data from a video bit stream. As depicted, further decode tasks 134 are performed on reconstructed frame 133. Processor core 141 performs further decode tasks 134 (e.g., including motion compensation) data 124 and parameters 126 (including values 126A and 126B) to generate video data 137 for rendering at video presentation device 138. In parallel, processor core 142 performs further decode tasks 134 on data 127 and parameters 129 (including values 131A and 131B) to generate video data 137 for rendering at video presentation device 138 (e.g., a television, a computer monitor, or other device screen). Also in parallel, one or more other processor cores 143 can process other data and parameters 136 (e.g., other data and values from frame 123) to generate video data 137 for rendering at video presentation device 138.

Figure 1C:
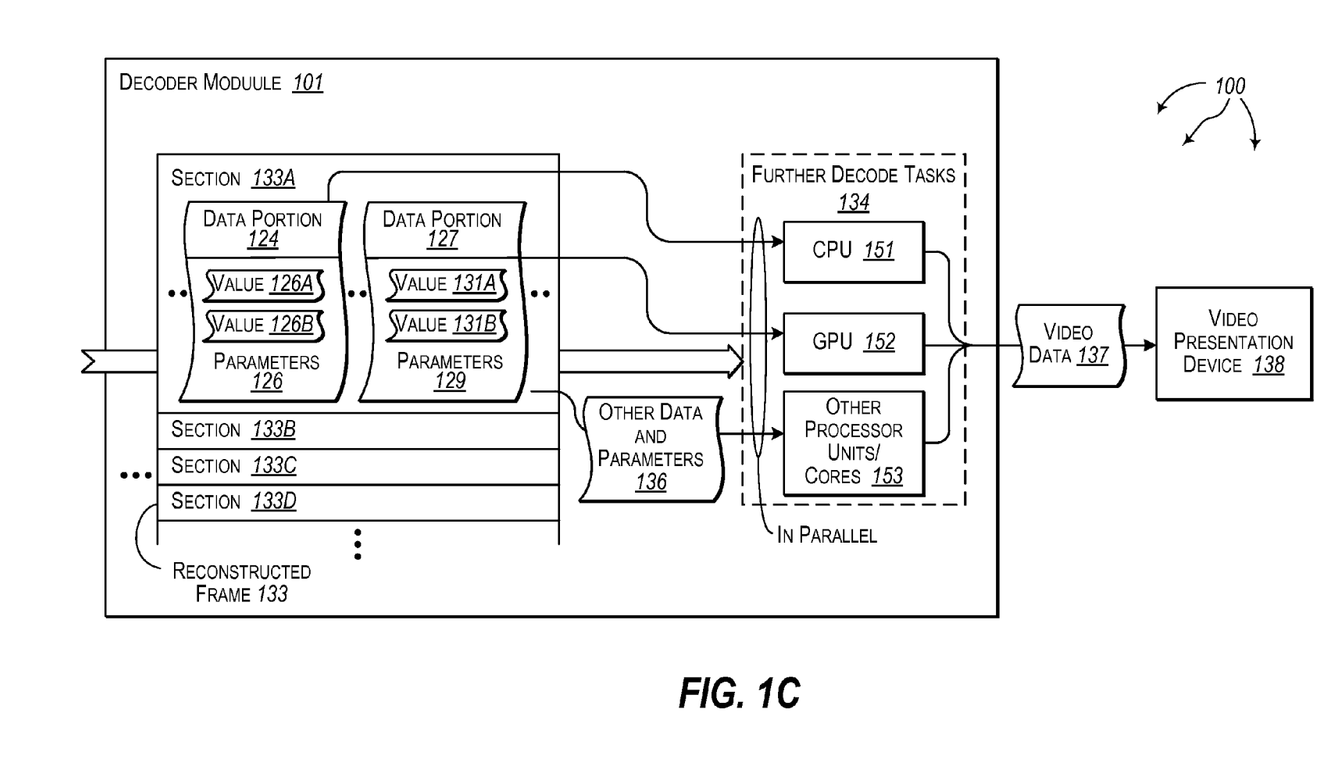
FIG. 1C illustrates an example architecture that facilitates parallel processing of data from a video bit stream.

Turning to FIG. 1C, FIG. 1C illustrates an alternate continuation example of computer architecture 100 that facilitates parallel processing of data from a video bit stream. As depicted, further decode tasks 134 (e.g., including motion compensation) are performed on reconstructed frame 133. Central Processing Unit (CPU) 151 performs further decode tasks 134 on data 124 and parameters 126 (including values 126A and 126B) to generate video data 137 for rendering at video presentation device 138. In parallel, Graphical Processing Unit (GPU) 152 performs further decode tasks 134 on data 127 and parameters 129 (including values 131A and 131B) to generate video data 137 for rendering at video presentation device 138. Also in parallel, one or more other processor units/cores 153 can process other data and parameters 136 (e.g., other data and values from frame 123) to generate video data 137 for rendering at video presentation device 138.

Data and parameter values in other reconstructed frames (e.g., a reconstructed frame corresponding to frame 122) can be similarly processed in parallel to generate further video data for rendering at video presentation device 138.

In general, processing of different data portions and parameter values can take different amounts of time to complete. However, even when processing of different data portions and parameter values starts and/or ends at different times, there may still be some amount of time when the different data portions and parameter values are processed in parallel (i.e., processing is occurring simultaneously at different processor cores).

Figure 3:
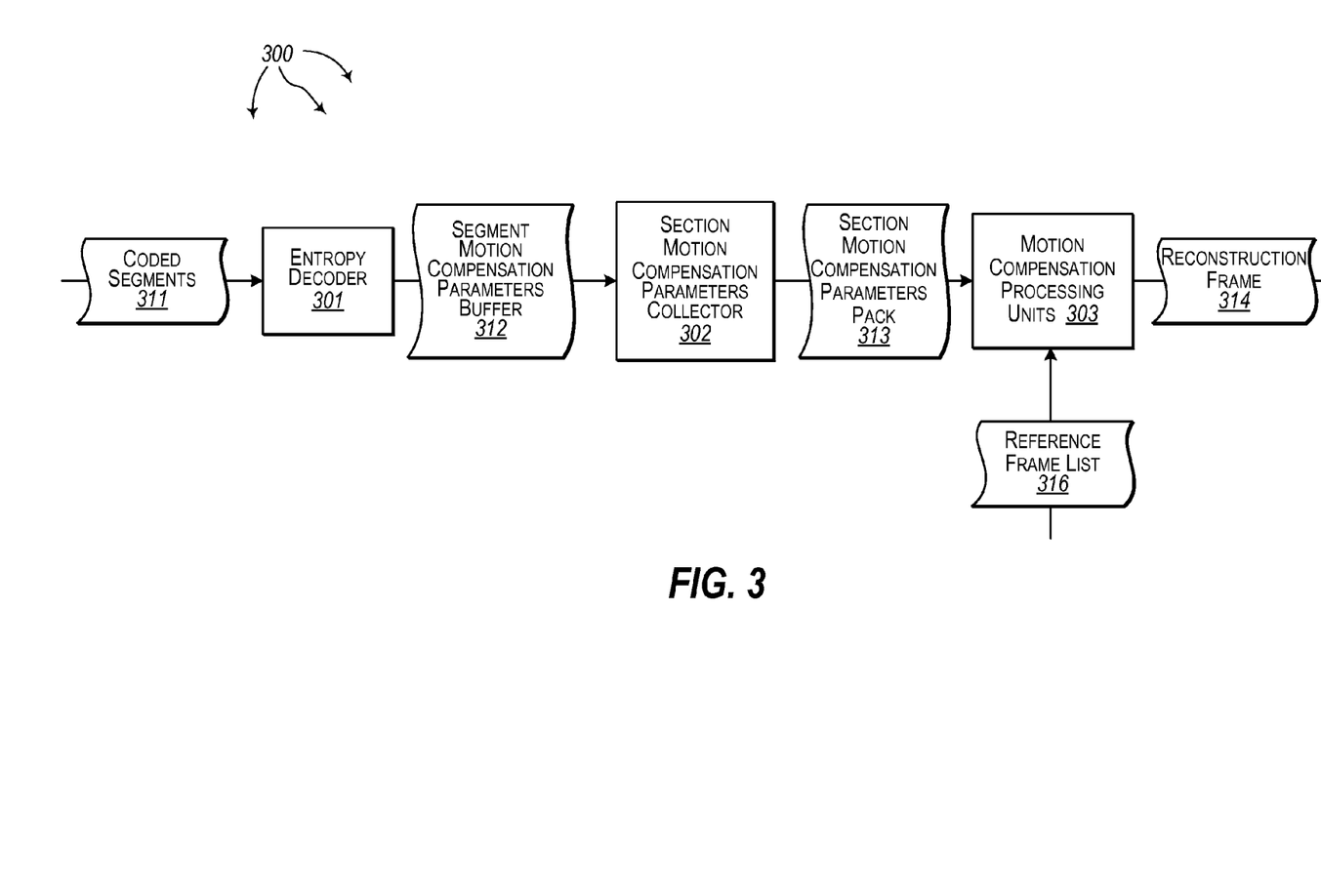
FIG. 3 illustrates an example architecture that facilitates transforming a video bit stream for parallel processing.

FIG. 3 illustrates an example architecture 300 that facilitates transforming a video bit stream for parallel processing. As depicted, architecture 300 includes entropy decoder 301, section motion compensation parameters collector 302, and motion compensation processing units 303. Entropy decoder 301 (e.g., a CABC decoder) can receive coded segments 311 (e.g., included in a frame of a video bit stream). Entropy decoder 301 can decode segment motion compensation parameters 312 from coded segments 311.

Section motion compensation parameters collector 302 can access segment motion compensation parameters 312. Segment motion compensation parameters collector 302 creates section motion compensation parameters pack 313 (including parameters for one or more of coded segments 311). Segment motion compensation parameters collector 302 removes any intra-segment dependencies between parameter values in section motion compensation parameters pack 313. Motion compensation units 303 utilize section motion compensation parameters pack 313 and reference frame list 316 (data from prior frames) to form reconstructed frame 314. Reconstructed frame 314 can then be forward on to further decoding tasks.

Figure 4:
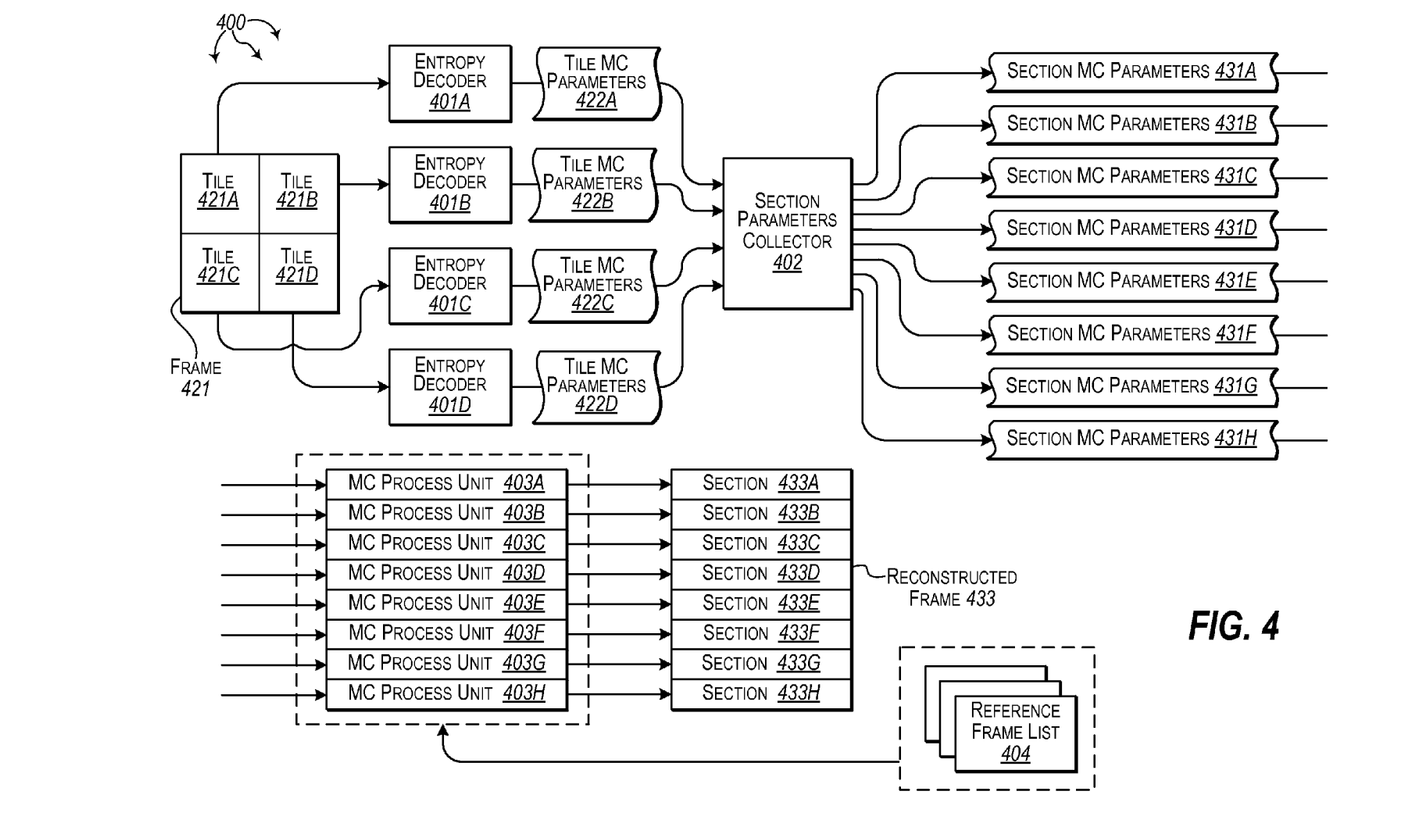
FIG. 4 illustrates an example architecture that facilitates transforming a video bit stream for parallel processing.

FIG. 4 illustrates an example architecture 400 that facilitates transforming a video bit stream for parallel processing. As depicted, architecture 400 includes entropy decoders 401A-401D, section parameters collector 402, and motion compensation processing units 403A-403H. Frame 421 (e.g., a frame of a video bit stream) is partitioned into tiles 421A-421D. Entropy decoders 401A-401D (e.g., CABAC decoders) access tiles 421A-421D respectively. Entropy decoders 401A-401D decode tile motion compensation parameters 422A-422D from tiles 421A-421D respectively.

Section parameter collector 402 accesses tile motion compensation parameters 422A-422D. Section parameter collector 402 creates section motion compensation parameters 431A-431H from tile motion compensation parameters 422A-422D. Each section motion compensation parameters can include compensation parameters from one or more of tiles 421A-421D. Segment parameter collector 402 removes any intra-tile dependencies between parameter values in section motion compensation parameters 431A-431H. Motion compensation processing units 403A-403H utilize motion compensation parameters 431A-431H respectively and reference frames list 404 to form sections 433A-433H respectively of reconstructed frame 433. Reconstructed frame 433 can then be forward on to further decoding tasks.

Figure 5:
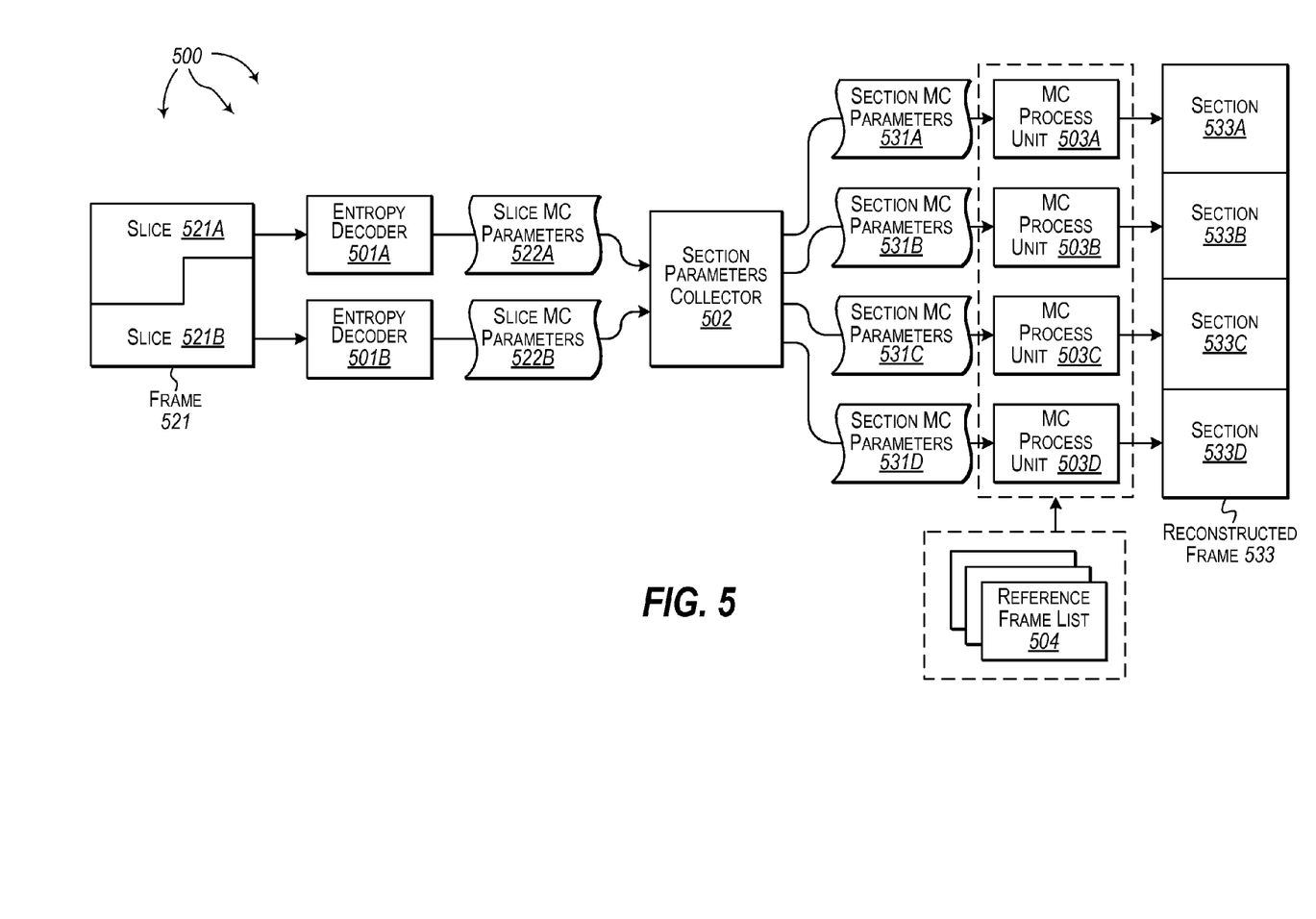
FIG. 5 illustrates an example architecture that facilitates transforming a video bit stream for parallel processing.

FIG. 5 illustrates an example architecture 500 that facilitates. As depicted, architecture 500 includes entropy decoders 501A and 501B, section parameters collector 502, and motion compensation processing units 503A-503D. Frame 521 (e.g., a frame of a video bit stream) is partitioned into slices 521A and 521B. Entropy decoders 501A and 501B (e.g., CABAC decoders) access slices 521A and 521B respectively. Entropy decoders 501A and 501B decode slice motion compensation parameters 522A and 522B from slices 521A and 521B respectively.

Section parameter collector 502 accesses slice motion compensation parameters 422A and 422B. Section parameter collector 502 creates section motion compensation parameters 531A-531D from slice motion compensation parameters 522A and 522B. Each section motion compensation parameters can include compensation parameters from one or more of slices 521A and 521B. Segment parameter collector 502 removes any intra-slice dependencies between parameter values in section motion compensation parameters 531A-531D. Motion compensation processing units 503A-503H utilize motion compensation parameters 531A-531D respectively and reference frames list 504 to form sections 533A-533D respectively of reconstructed frame 533. Reconstructed frame 533 can then be forward on to further decoding tasks.

Accordingly, in some aspects, an entropy (e.g., Context-Adaptive Binary Arithmetic Coding (CABAC)) decoding stage collects motion compensation parameters, such as, motion vectors, block partitions, reference indices, etc., for each segment. As depicted in FIGS. 4 and 5, an entropy decoder can work in parallel at the segment level. A separate motion compensation parameters buffer can be used for each segment to remove intra-segment dependencies between parameter values.

A section motion compensation parameters collector reorders motion compensation parameters and packs the motion compensation parameters in a section based motion compensation parameter list data structure. In a reconstruction stage, each motion compensation processing unit takes motion compensation parameters from one section as input data. Motion compensation processing is isolated by video frame space. Each compensation unit's output data can be updated in its own section without conflicts.

For HEVC (H.265), a Coding Tree Unit (CTU) row based processing section is optimized for synchronization and data representation, and gives improved parallelization capability for modern CPU and DSP processor. For example, for an HD 1080 video sequence, up to 17 independent motion compensation processing units can be created for a single frame. For a 4K UHD video sequence, up to 34 independent motion compensation processing units can be created for a single frame.

In one aspect, a system includes a processor, system memory, and a decoder. The decoder can use the processor to receive a frame from a video bit stream, the frame partitioned into one or more segments. For at least one segment from among the one or more segments, the decoder can use the processor to decode a first data portion and a second data portion from the segment. The first data portion has first parameters defining how to visually present the first data portion and the second data portion has second parameters defining how to visually present the first data portion. For at least one segment from among the one or more segments, the decoder can use the processor to determine that values for the second parameters are dependent on values for the first parameters.

The decoder can use the processor to form a reconstructed frame, the reconstructed frame breaking the dependency of the values for the second parameters on the values for the first parameters. Forming as reconstructed frame can include the decoder using the processor to calculate new values for the second parameters based on the values for the second parameters and the values for the first parameters. Forming a reconstructed frame can include the decoder using the processor to reconstruct the frame. Reconstructing the frame can include using the new values for the second parameters to define how to visually present the second data portion. The frame can be reconstructed in one or more independently processable sections. Accordingly, the second data portion can be processed in parallel with the first data portion.

In another aspect, a method for breaking inter-segment dependencies is performed. A frame from a video bit stream is received. The frame is partitioned into one or more segments. For at least one segment from among the one or more segments, a first data portion and second data portion are decoded from the segment. The first data portion has first parameters defining how to visually present the first data portion and the second data portion has second parameters defining how to visually present the second data portion. For the at least one segment, it is determined that values for the second parameters are dependent on values for the first parameters.

A reconstructed frame is formed. The reconstructed frame breaks the dependency of the values for the second parameters on the values for the first parameters. Forming a reconstructed frame includes calculating new values for the second parameters based on the values for the second parameters and the values for the first parameters. Forming a reconstructed frame includes reconstructing the frame in one or more independently processable sections. Within one of the one or more independently processable sections, the new values are used for the second parameters to define how to visually present the second data portion. Accordingly, the second data portion can be processed in parallel with the first data portion.

In a further aspect, a system includes a processor, system memory, and a decoder. The decoder uses the processor to access a reconstructed frame for a video bit stream. The reconstructed frame has one or more independently processable sections. A section, from among the one or more independently processable sections, includes a first data portion and a second data portion. The first data portion has first parameters defining how to visually present the first data portion and the second data portion has second parameters defining how to visually present the second data portion. Parallel processing of the first data portion and the second data portion are limited by the values of the second parameters being dependent on the values of the first parameters in the frame used to form the reconstructed frame. The dependency having been broken during reconstruction of the reconstructed frame such that the first data portion and the second data portion can now be processed in parallel.

The decoder uses the processor to provide the values for the first parameters to a first processing element for processing. The first processing element processes the values for the first parameters to visual present the first data portion at a video output device. In parallel with providing values for the first parameters to the first processing element, the decoder uses the processor to provide the values for the second parameters to a second different processing element for processing. The second processing element processes the values for the second parameters to visual present the second data portion at a video output device.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A system, the system comprising:
a processor;
system memory;
a decoder, using the processor, configured to:
receive a frame from a video bit stream, the frame partitioned into one or more segments;
for at least one segment from among the one or more segments:
decode a first data portion and a second data portion from the segment, the first data portion having first parameters defining how to decode and visually present the first data portion and the second data portion having second parameters defining how to decode and visually present the second data portion; and
determine that values for the second parameters are dependent on values for the first parameters;
form a reconstructed frame, the reconstructed frame breaking the dependency of the values for the second parameters on the values for the first parameters including:
calculate new values for the second parameters based on the values for the second parameters and the values for the first parameters; and
reconstruct the frame, including using the new values for the second parameters to define how to visually present the second data portion such that the second data portion can be processed in parallel with the first data portion.

2. The system of claim 1, wherein a decoder, using the processor, being configured to reconstruct the frame comprises a decoder, using the processor, being configured to refer to one or more frames in a reference frame list, the one or more frames being prior frames in the video bit stream.

3. The system of claim 1, wherein a decoder, using the processor, being configured to decode a first data portion and a second data portion from the segment comprises a decoder, using the processor, being configured to decode values for one or more of motion vectors, block partitions, and reference indices from the segment.

4. The system of claim 1, wherein the video bit stream is formatted in accordance with one of: H.264, HEVC, VP8, or VP9.

5. The system of claim 1, the decoder, using the processor, further configured to send the reconstructed frame to a further decode task.

6. The system of claim 1, the decoder, using the processor, further configured to process the reconstructed frame to visually present data from the video bit stream at a video output device, including processing the first data portion and the second data portion in parallel to visually present the first data portion and the second data portion at the video output device.

7. The system of claim 6, wherein a decoder, using the processor, being configured to process the reconstructed frame comprises:
the decoder, using the processor, being configured to process the first data portion at a first processor core to visually present the first data portion as defined by the values for the first parameters; and
in parallel, the decoder, using the processor, being configured to process the second data portion at a second different processor core to visually present the second data portion as defined by the new values for the second parameters.

8. The system of claim 1, wherein a decoder, using the processor, being configured to determine that values for the second parameters are dependent on values for the first parameters comprise a decoder, using the processor, being configured to determine that a value for the location of the second data portion is a relative value, the relative value relative to the value for the location of the first data portion; and
wherein a decoder, using the processor, being configured to calculate new values for the second parameters based on the values for the second parameters and the values for the first parameters comprise a decoder, using the processor, being configured to calculate a new absolute value for the location of the second portion of data based on the value for the location of the first data portion and the relative value for the second data portion.

9. A method for use at a computer system, the method comprising:
for at least one segment from among the one or more segments in frame of a video bit stream:
decoding a first data portion and a second data portion from the segment, the first data portion having first parameters defining how to visually present the first data portion and the second data portion having second parameters defining how to visually present the second data portion; and
determining that values for the second parameters are dependent on values for the first parameters;
forming a reconstructed frame, the reconstructed frame breaking the dependency of the values for the second parameters on the values for the first parameters, including:
calculating new values for the second parameters based on the values for the second parameters and the values for the first parameters; and
reconstructing the frame in one or more independently processable sections, including, within one of the one or more independently processable sections, using the new values for the second parameters to define how to visually present the second data portion such that the second data portion can be processed in parallel with the first data portion.

10. The method of claim 9, wherein reconstructing the frame comprises referring to one or more frames in a reference frame list, the one or more frames being prior frames in the video bit stream.

11. The method of claim 9, wherein decoding a first data portion and a second data portion from the segment comprises decoding values for one or more of motion vectors, block partitions, and reference indices from the segment.

12. The method of claim 9, wherein the video bit stream is formatted in accordance with one of: H.264, HEVC, VP8, or VP9.

13. The method of claim 9, further comprising sending the reconstructed frame to a further decode task.

14. The method of claim 9, further comprising processing the reconstructed frame to visually present data from the video bit stream at a video output device, including processing the first data portion and the second data portion in parallel to visually present the first data portion and the second data portion at the video output device.

15. The method of claim 14, wherein processing the reconstructed frame comprises:
processing the first data portion at a first processor core to visually present the first data portion as defined by the values for the first parameters; and
in parallel, processing the second data portion at a second different processor core to visually present the second data portion as defined by the new values for the second parameters.

16. The method of claim 9, wherein determining that values for the second parameters are dependent on values for the first parameters comprises determining that a value for the location of the second data portion is a relative value, the relative value relative to the value for the location of the first data portion; and
wherein calculating new values for the second parameters based on the values for the second parameters and the values for the first parameters comprises calculating a new absolute value for the location of the second portion of data based on the value for the location of the first data portion and the relative value for the second data portion.

17. A system, the system comprising:
a processor;
system memory;
a decoder, using the processor, configured to:
access a reconstructed frame for a video bit stream, the reconstructed frame having one or more independently processable sections, a section, from among the one or more independently processable sections, including a first data portion and a second data portion, the first data portion having first parameters defining how to visually present the first data portion and the second data portion having second parameters defining how to visually present the second data portion, parallel processing of the first data portion and the second data portion being limited by the values of the second parameters being dependent on the values of the first parameters in the frame used to form the reconstructed frame, the dependency broken during reconstruction of the reconstructed frame such that the first data portion and the second data portion can now be processed in parallel;
provide the values for the first parameters to a first processing element for processing, the first processing element processing the values for the first parameters to visual present the first data portion at a video output device; and
in parallel with providing values for the first parameters to the first processing element, provide the values for the second parameters to a second different processing element for processing, the second processing element processing the values for the second parameters to visual present the second data portion at a video output device.

18. The system of claim 17, wherein the first processing element is a processing core of a Central Processing Unit (CPU).

19. The system of claim 17, wherein the first processing element is a processor of a Graphical Processing Unit (GPU).

20. The system of claim 17, wherein a decoder, using the processor, being configured to provide the values for the second parameters to a second different processing element for processing comprises a decoder, using the processor, being configured to provide the values for the second parameters to a second different processing element prior to the first processing element completely processing the values for the first parameters.

* * * * *